E. E. MULLVAIN.
SIGNAL SYSTEM.
APPLICATION FILED AUG. 27, 1912.
1,107,697.
Patented Aug. 18, 1914.
2 SHEETS—SHEET 1.
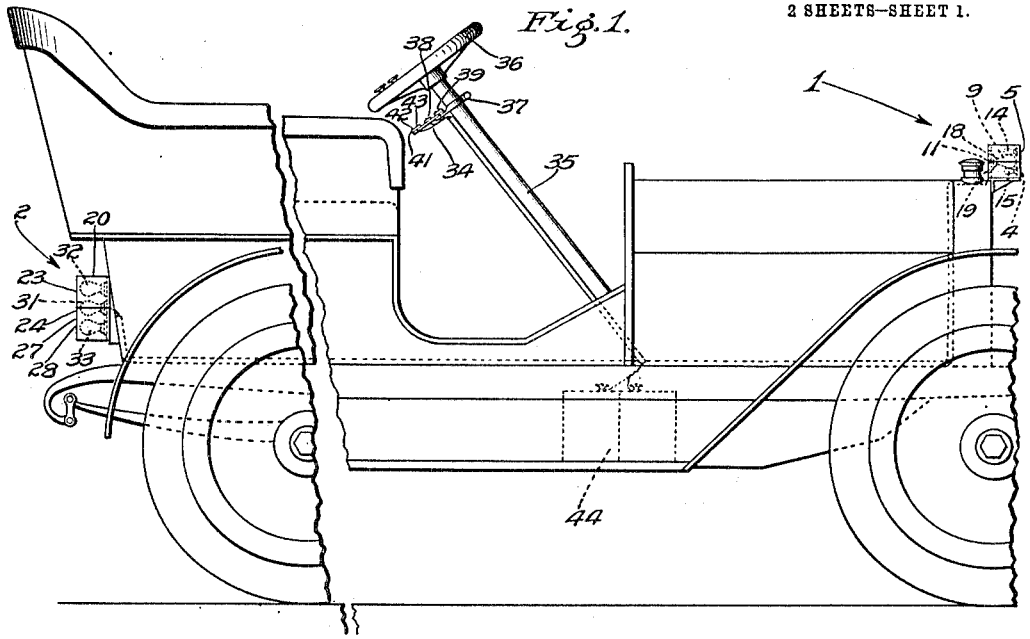
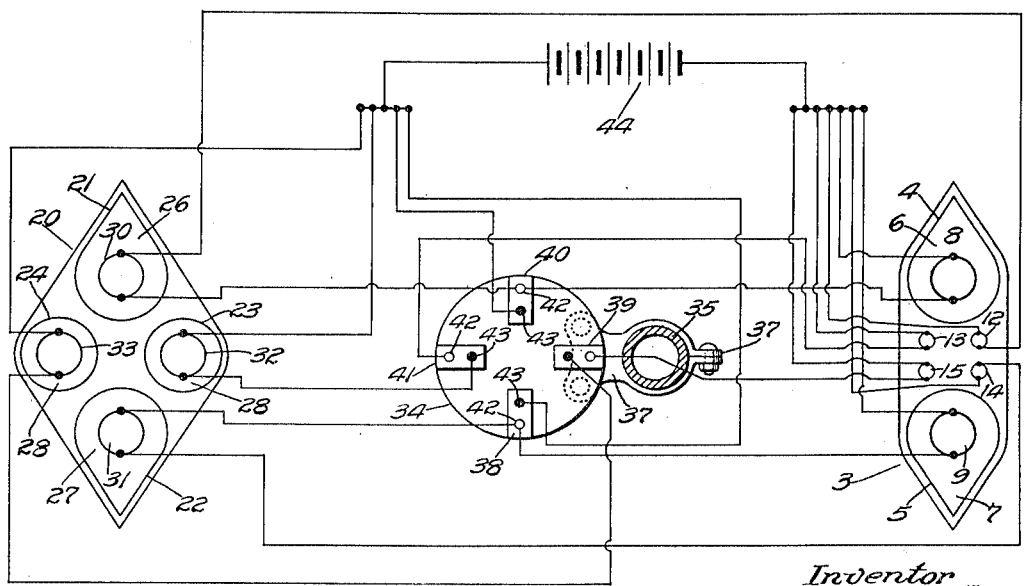
Witnesses:
W. N. Lushby
L. Belle Rice
Inventor
Earnest E. Mullvain
by James R. Townsend
his atty E. E. MULLVAIN.
SIGNAL SYSTEM.
APPLICATION FILED AUG. 27, 1912.
1,107,697.
Patented Aug. 18, 1914.
2 SHEETS—SHEET 2.
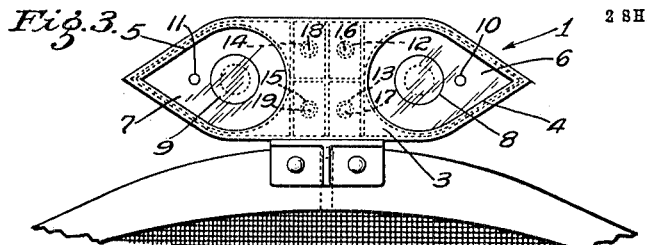
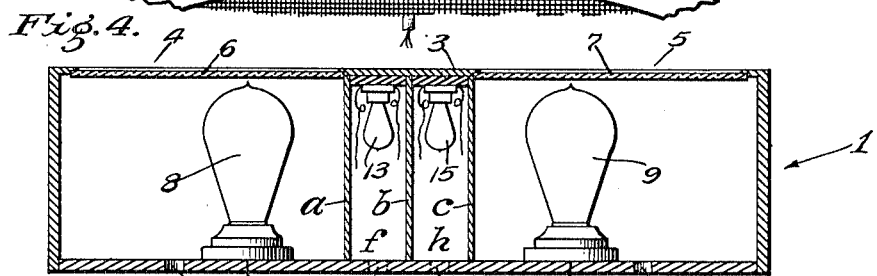
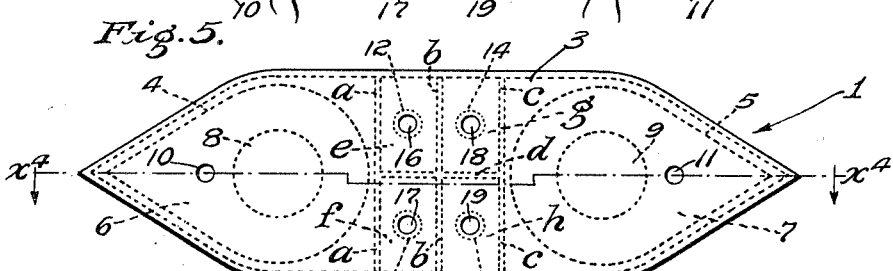
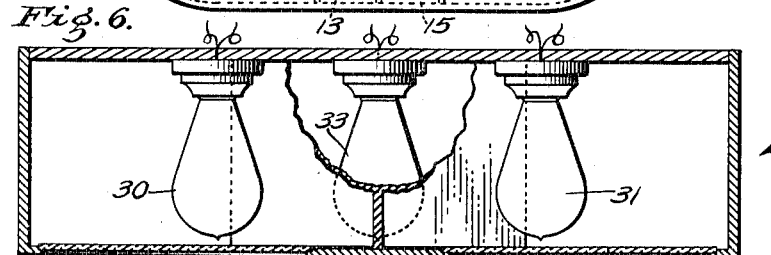
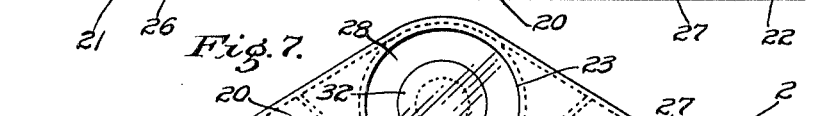
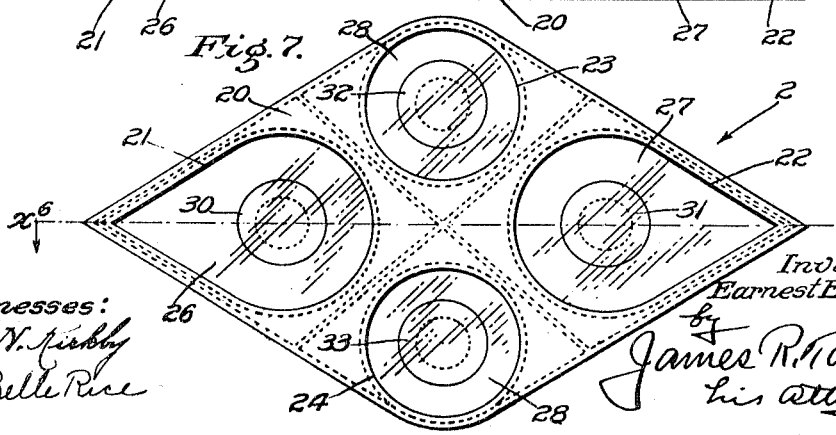
Witnesses:
H. N. Kirby
L. Belle Rice
Inventor
Earnest E. Mullvain
by
James R. Townsend
his atty.

UNITED STATES PATENT OFFICE.

EARNEST EARL MULLVAIN, OF LOS ANGELES, CALIFORNIA.

SIGNAL SYSTEM.

1,107,697.  Specification of Letters Patent.  Patented Aug. 18, 1914.

Application filed August 27, 1912. Serial No. 717,379.

*To all whom it may concern:*

Be it known that I, EARNEST EARL MULLVAIN, a citizen of the United States, residing at Los Angeles, in the county of Los Angeles and State of California, have invented a new and useful Signal System, of which the following is a specification.

My invention relates to a signal system for use primarily in the automobile traffic, though it may readily be adopted in connection with other forms of conveyance, such as yachts, sailing craft, etc. Collisions and accidents often occur, due to misunderstandings between drivers passing in the same or opposite directions and in crowded centers considerable danger arises from the uncertainty attendant upon the movements of approaching and receding vehicles. Much of this danger could be eliminated by providing the vehicles with visual signals showing the intended movement of the vehicle, that is whether the driver will turn his vehicle to the right or to the left, will slow it down or will reverse the direction of its motion.

It is the object of this invention, first, to provide a simple and efficient signal system by which a driver may make known his intentions in the above respects. Second, to provide means whereby the driver from his seat can readily ascertain the condition of the signal system, and which will attract his attention in case any of the signals fail to operate satisfactorily. Third, to secure a convenient distribution and location of parts, so that the system may be conveniently operated from the driver's seat.

Other objects and advantages may become clear by reference to the detailed description following.

The accompanying drawings illustrate the invention.

Figure 1 is a side view showing the newly invented system attached to an automobile, it being understood, however, that the latter typifies conveyance means in general. Fig. 2 is a diagrammatic developed view of the system, the forward and rear signal cases having been swung ninety degrees out of their normal vertical plane to a horizontal plane, thus showing the location of the various signals as viewed from behind the vehicle. Fig. 3 is a front view of the forward signal box and presents it as seen by a person ahead of the vehicle to which it is attached. Fig. 4 is a plan section on line $x^4-x^4$, Fig. 5, the lamps, however, being shown in full. Fig. 5 is a rear view of the forward signal box and presents it as seen from the driver's seat. Fig. 6 is a plan section taken on the line $x^6$ of Fig. 7, the lamps being shown in full. Fig. 7 is a rear elevation of the rear signal case and presents it as seen by a person behind the vehicle.

As is seen from Fig. 1 my signal system consists primarily of two portions inclosed in casings 1 and 2, the casing 1 being attached to the automobile near the front, while casing 2 is attached near the rear. The casing 1 is provided at its forward side with an opaque closure 3 having the pointer-shaped apertures 4 and 5 clearly seen in Figs. 3 and 5. These apertures are closed by plates 6 and 7 of ground or plain glass fastened to the closure. Attached to the rear of casing 1 are the electric lamps 8 and 9, the apertures 10 and 11 serving as peep-holes, being provided in said rear face of the casing adjacent said lamps. Suitable electric current being passed through either lamp 8 or 9, their light will shine through ground glasses 6 or 7; and in view of the shape of apertures 4 and 5, will present an arrow or pointer-shaped light to a person standing before the case. For convenience these will subsequently be referred to as pointer lights 4 and 5. Viewing the casing from a rear point such as the driver's seat, one can readily ascertain through apertures 10 and 11 whether lamps 8 and 9 light satisfactorily, the glasses 6 and 7 reflecting their light through said apertures sufficiently for this purpose. If preferred, however, the lamps 8 and 9 may be mounted with their axis transverse of the casing 1, so that their light shines directly through the peep-holes. Using one lamp only this arrangement may not secure the same desirable distribution through the glasses 6 and 7. By suitable partitions $a$, $b$, $c$, $d$, chambers $e$, $f$, $g$, $h$ are formed in which the small pilot lamps 12, 13, 14 and 15 are mounted for a purpose disclosed below. These lamps are attached to the front piece 3, while apertures 16, 17, 18 and 19 are provided in the rear of casing 1 opposite the pilot lamps 12, 13, 14 and 15 respectively. These apertures provide suitable peep-holes by which the condition of the pilot lamps can be ascertained from the driver's seat. If preferred each of the peep-holes 10 and 11, 16, 17, 18 and 19 may be provided with a lens or ground glass for intensifying the light, and sealing the casing against dust and moisture. The casing 2 is provided similarly with a front piece 20 having pointer-shaped apertures 21 and 22, the apertures 23 and 24 shown round, though the latter may be square or of any other preferred form. These apertures are closed by glass plates 26, 27 and 28, the latter closing both apertures 23 and 24. Across the casing are provided compartments for each of the lamps 30, 31, 32 and 33, mounted on the rear side of casing 2, and in the compartments respectively.

It is understood, of course, that the material comprising casings 1 and 2 is opaque, so that no light is emitted through the same, except by the apertures provided.

Referring to Figs. 1 and 2 the switch block 34 is seen mounted upon and rearwardly of the steering standard 35 immediately below the steering wheel 36 by means of a clamp 37 that is fixed to the block 34 and clamped around the standard 35. The switch block 34 is provided with the switches 38, 39, 40 and 41, of ordinary construction and comprising buttons 42 and 43, one of which is pressed to light a signal lamp and thereby distinguish a particular pointer as indicating the intended change of movement, the other being pressed to extinguish the same.

An electric power source 44 is provided, and is shown as a battery, but a dynamo or any other current producer may be substituted.

By reference to Fig. 2 it is seen that the lamps 9 and 31 are connected in parallel across the electric source and are controlled by the switch 38. The pilot lamp 14 is connected in series with the lamp 31. Similarly the lamps 8 and 30 are connected in parallel to the power source and are controlled by the switch 40, the pilot lamp 12 being connected in series with lamp 30. The lamps 13 and 32 are connected in series and to the power source through switch 41. The lamps 15 and 33 are connected in series and to the power source through switch 39. According to this wiring scheme it is seen that lamps 9, 31 and pilot lamp 14 are lighted simultaneously off switch 38, while lamps 8, 30 and 12 are lighted simultaneously off switch 40.

The pointers formed at 4, 5, 21 and 22 are arranged pointing in opposite directions and lying transverse of the direction in which the conveyance moves and means are provided to distinguish the pointers independently, so that to the person viewing the vehicle from either front or back the pointer which indicates the change of direction the vehicle is about to take will be readily seen.

The mode of operation of my device is as follows:—When the driver wishes to indicate his intention of turning his vehicle to the right he operates switch 38, thereby distinguishing or lighting the pointer lights 5 and 22 pointing toward the right of the vehicle, the former signaling to vehicles or pedestrians ahead and the latter signaling to those behind. Similarly if the driver desires to signal his intention of turning to the left he operates switch 40 so as to distinguish or light the pointer lights 4 and 21 pointing toward the left of the vehicle.

In order that the signals of my system shall be more readily intelligible at great distances beyond which the direction of the pointers is discernible the glasses on the pointer lights may be given different standard and characteristic colors, universally adopted and understood by all drivers.

The pointers 5 and 22 are preferably made green and indicate an intention of turning to the right or starboard side of the conveyance, while pointers 4 and 21 are preferably made red and indicate an intention of turning to the left or port side. Other colors may be chosen but red and green are preferable as being the standard nautical colors indicating the port and starboard side.

To signal his intention of slowing up the driver operates the switch 41, lighting the rear lamp 32. The glass covering this lamp preferably has a characteristic color, such as blue, which will have the standard meaning assigned and universally understood. Similarly, to signal his intention of reversing his conveyance the driver operates switch 39, lighting lamp 33, covered preferably with an orange glass universally understood as a signal for such intention.

It is clear that from the driver's seat it could not ordinarily be ascertained whether the signal lamps in rear casing 2 were lighted or not. To surmount this objection the pilot lamps 12, 14, 13 and 15 are placed in series with the rear lamps 30, 31, 32 and 33 respectively, the former being located in the forward box 1 which is easily visible from the driver's seat, and the light of these pilots coming through peep-holes 16, 18, 17 or 19 respectively is a positive indication that the rear signal lamps are lighted. The condition of the forward signal lamps 8 and 9 is ascertained through the apertures 10 and 11 as previously disclosed.

In the appended claims the pointer lights 5 and 22 are referred to as one pair since these light simultaneously and signal the same intention. Similarly pointer lights 4 and 21 are referred to as a second pair. It is clear that the color of the lights may be secured either by using colored glass covering the apertures in the signal case, or else by using plain or ground glass with lamps having colored bulbs.

I claim:—

1. In combination, a conveyance, signaling means located near the forward end of the conveyance, said signaling means being visible from in front of said conveyance; second signaling means located near the rear of the conveyance, said second signaling means being visible from behind said conveyance; a casing having opaque sides for the forward signaling means, electric lights for illuminating the first and second said signaling means, the electric lights for the first said signaling means being located within said opaque casing, pilot lights in series circuit with the electric lights for the second said signaling means, said pilot lights also being located within said opaque casing, and said opaque casing having apertures adjacent the inclosed electric lights and said pilot lights, said apertures opening toward the rear of the conveyance.

2. In combination a conveyance, signaling means located near the rear end of the conveyance, said signaling means being visible from behind said conveyance, electric lights for illuminating the signaling means, a pilot light in series circuit with the electric light of each signaling means to indicate to the driver that the proper signal is displayed, a casing having opaque sides located near the forward end of the conveyance, said pilot lights being located in said casing, and apertures in said casing adjacent the inclosed pilot lights, said apertures opening toward the rear of the conveyance.

3. In combination, a conveyance, signaling means located near the forward end of the conveyance, said signaling means being visible from in front of said conveyance, second signaling means located near the rear of the conveyance, said second signaling means being visible from behind said conveyance; a casing for the forward signaling means, electric lights for illuminating the first and second said signaling means, the electric lights for the first said signaling means being located within said casing, and pilot lights in series circuit with the electric lights for the second said signaling means, said pilot lights also being located within said casing and being visible from behind said casing.

4. In combination, a conveyance, signaling means located near the forward end of the conveyance, said signaling means being visible from in front of said conveyance; second signaling means located near the rear of the conveyance, said second signaling means being visible from behind said conveyance, a casing having opaque sides for the forward signaling means, electric lights for illuminating the first and second said signaling means, the electric lights for the first said signaling means being located within said casing, the electric lights for the first said signaling means being in series circuit with the electric lights for the second said signaling means, and said opaque casing having apertures adjacent the inclosed electric lights, said apertures opening toward the rear of the conveyance.

In testimony whereof, I have hereunto set my hand at Los Angeles, California, this 21st day of August, 1912.

EARNEST EARL MULLVAIN.

In presence of—
  JAMES R. TOWNSEND,
  L. BELLE RICE.